W. G. COWART.
PLANT PROTECTOR.
APPLICATION FILED JULY 3, 1912.
1,051,693.
Patented Jan. 28, 1913.
Fig. 1.
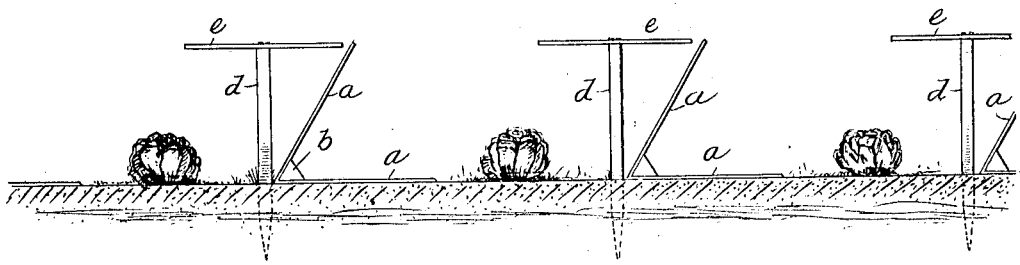
Fig. 2.
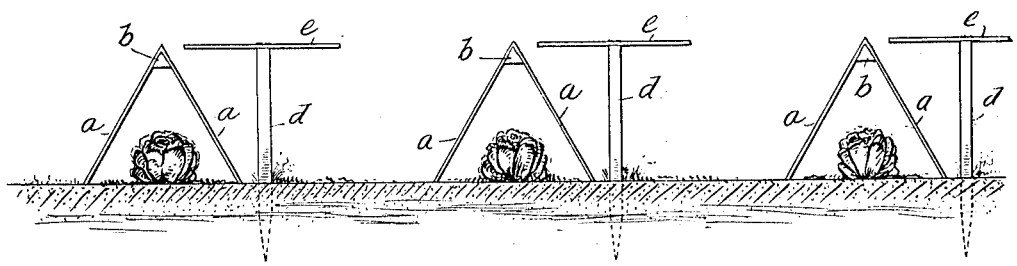
Fig. 3.
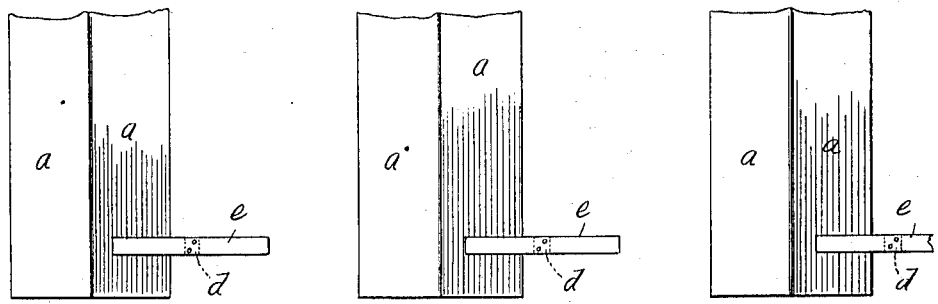
Fig. 5.
Fig. 4.
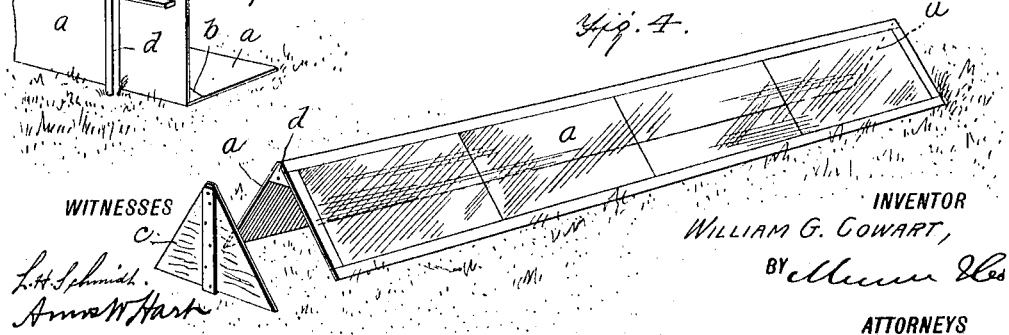
WITNESSES
L. H. Schmidt.
Anna W. Hart.
INVENTOR
WILLIAM G. COWART,
BY
ATTORNEYS

UNITED STATES PATENT OFFICE.

WILLIAM GREENE COWART, OF NOCATEE, FLORIDA.

PLANT-PROTECTOR.

1,051,693.  Specification of Letters Patent.  Patented Jan. 28, 1913.

Application filed July 3, 1912. Serial No. 707,498.

*To all whom it may concern:*

Be it known that I, WILLIAM G. COWART, a citizen of the United States, and a resident of Nocatee, in the county of De Soto and State of Florida, have invented an Improvement in Plant-Protectors, of which the following is a specification.

This invention comprises, first, a protector proper formed of two oblong panels secured together rigidly at an angle to each other, whereby the device is adapted to be applied over and protect plants, and it comprises, secondly, a means for supporting the protector proper when turned on its side, so that it is held constantly in position for replacement over the plants.

The details of construction and combination of parts are as hereinafter described, and illustrated in the accompanying drawing, in which—

Figure 1 is an end view of a series of protectors arranged side by side and parallel to corresponding rows of plants, the protectors being shown removed from the plants and lying on their sides. Fig. 2 is an end view of a series of protectors arranged over plants. Fig. 3 is a plan view. Fig. 4 is a perspective view illustrating a modification. Fig. 5 is a perspective view illustrating a slight modification.

The protector is formed of two oblong rectangular panels $a$ $a$, which are secured together at one side edge, preferably at a slightly acute angle. A triangular bar or rib $b$ may be arranged at the apex of the angle and the respective panels secured thereto. The panels may be constructed, in part, of any light material, preferably of wood veneer or of glass, as shown in Fig. 4. The protector is preferably open at each end, but it may be provided with a closure $c$, as shown in Fig. 4.

When placed over plants, the arrangement is as shown in Fig. 2, the protectors straddling the plants and their lower side edges resting on or slightly embedded in the soil. The rows of plants will ordinarily run east and west, and the protectors will, of course, be alined in the same direction. When the plants are uncovered, the protectors are laid on their sides adjacent to the plants, as shown in Fig. 1.

It is apparent that a quite strong wind from the direction in which the apexes of the protectors project, say from the north, would not displace the protectors, but if the wind were from the opposite direction, say from the south, it would act on the raised panels and easily overturn the protectors. To prevent this result, I employ a guard consisting of a stake $d$ having a top crosspiece $e$. The stakes are driven vertically into the soil at a point adjacent to the apexes of the protectors and thus the panel which is raised or projects upward is in contact with or close to one of the arms of a crosspiece $e$. Thus the guard serves effectively to prevent overturning of the protector and at the same time does not obstruct the tilting of the protector back to its normal position in which it covers the plants, as shown in Fig. 2.

The protector is easily manipulated for removing it from or placing it over a row of plants, and when laid upon the ground, as in Fig. 1, it leaves the plant freely exposed to air and sunlight, but the panel which in such case projects upward may serve at the same time as a guard, preventing the access of a cold or raw wind to the plants.

In case the protector panels $a$ are placed at a right angle to each other, the stake $d$ may be turned a quarter around in order to place the cross-piece $e$ parallel to the protector.

What I claim is:—

The combination with a plant protector having an angular form and a guard consisting of a vertical stake having a projecting arm adapted for contact with a panel of the protector when lying upon the ground, as described.

WILLIAM GREENE COWART.

Witnesses:
D. F. HUTCHINSON,
T. M. PETERSON.

Copies of this patent may be obtained for five cents each, by addressing the "Commissioner of Patents, Washington, D. C."